United States Patent [19]

Kao

[11] Patent Number: 4,765,501

[45] Date of Patent: Aug. 23, 1988

[54] TOY CONTAINER

[76] Inventor: Joe Kao, 3F., No.35, Ching Chung Street, Taipei, Taiwan

[21] Appl. No.: 91,997

[22] Filed: Sep. 2, 1987

[51] Int. Cl.$^4$ .......................... B65D 6/00; B65D 6/12; B65D 6/16

[52] U.S. Cl. .................................................. 220/4 B

[58] Field of Search ...................... 220/4 B, 306, 307; 403/288

[56] References Cited

U.S. PATENT DOCUMENTS

| 2,706,065 | 4/1955 | Stone | 220/4 B |
|---|---|---|---|
| 2,745,642 | 5/1956 | Hermann | 220/4 B |
| 3,341,048 | 9/1967 | Carbone | 220/4 B |
| 4,030,850 | 6/1977 | Hyde | 220/306 |

Primary Examiner—George T. Hall
Attorney, Agent, or Firm—Morton J. Rosenberg

[57] ABSTRACT

A toy container for holding children's toys or candies inside is disclosed. The toy container consists of a upper shell and a lower shell. There are three annular ribs at the lower portion of the upper shell as well as three annular ribs at the upper portion of the lower shell. These ribs cooperate with each other whereby the upper shell and lower shell can be tightened together securely. Still, the upper shell can be separated easily from the lower shell by pressing the upper shell and pulling off the upper shell from the lower shell.

2 Claims, 4 Drawing Sheets

TOY CONTAINER

BACKGROUND OF THE INVENTION

The present invention relates to a toy container which can be used for holding children's toys or candies therein.

At present, there are various kinds of containers mainly for children's play, which contain little toys or candies. However, prior arts of this kind have the following drawbacks:

(A) The container is composed of an upper shell and a lower shell, and is loosely fastened together. It can easily open upon dropping, making the articles contained therein scattered all over the ground.

(B) The upper shell and the lower shell of the conventional container are made up of two different kinds of acrylic-plastics, the upper shell being made of hard acrylic-plastics. With the container of the described above, the upper shell easily broken into pieces upon dropping down and it is unsafe to children.

The prior art toy container shown in FIG. 4-6 is characterized in that it has two separate shells 3 and 4. The upper shell 4 has an annularly inclined protrusion 41 around its bottommost portion, and the lower shell 3 had an annularly flat protrusion 31 around its upper portion, which cooperates with the protrusion 41 of the upper shell to fasten the container.

As can be seen, the toy container 3 is easily separated into two parts upon dropping down for the upper shell and the lower shell of the container are only loosely fastened together by the annular protursions 31 and 41.

SUMMARY OF THE INVENTION

Accordingly, the object of the present invention is to overcome the aforesaid problems encountered in the conventional toy container.

Briefly, this invention contains an upper shell and a lower shell. There are three annular ribs in the upper and lower shells separately, which are so formed that these two shells will be tightened together securely if desired, while these two shells still can be separated easily. The upper and lower shells are made of similar soft acrylic-plastic so that the container is not easily broken into pieces upon dropping.

An embodiment of the present invention will now be described by way of example but not by way of limitation with reference to the accompanying drawings.

DETAILED DESCRIPTION OF THE PREFERRED EMBODIMENT

Figure 1:
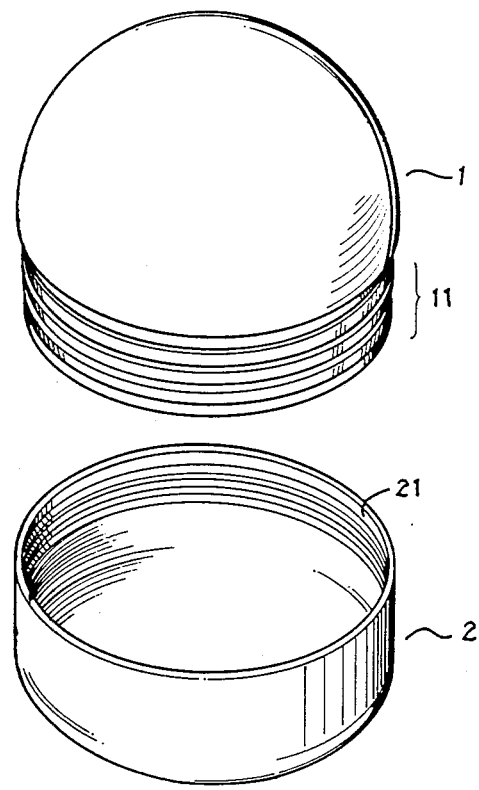
FIG. 1 is an exploded view of one embodiment of the toy container according to the present invention.
Figure 2:
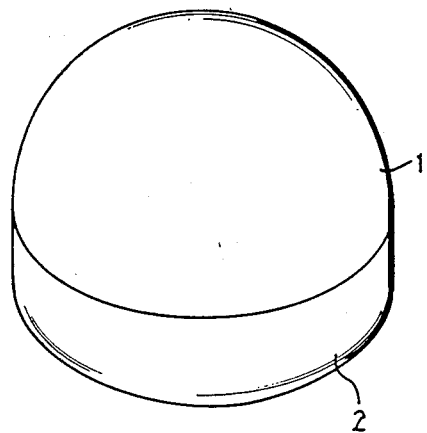
FIG. 2 is a perspective view of a toy container in accordance with the present invention.

Referring to the drawings, one embodiment of the toy container according to the present invention is illustrated. As shown in FIG. 1, the toy container comprises two parts, a upper shell 1 and a lower shell 2. The upper shell 1 is more or less semi-circular in shape except for its lower portion, which is cylindrical with three annular ribs 11 on the outer surface. The lower shell 2 is shallowly semi-circular in shape with its base being flat. At the upper portion of the lower shell 2, there are also three annular ribs 21 on the inner surface thereof, which cooperate with the ribs 11 of the upper shell 1.

Figure 3:
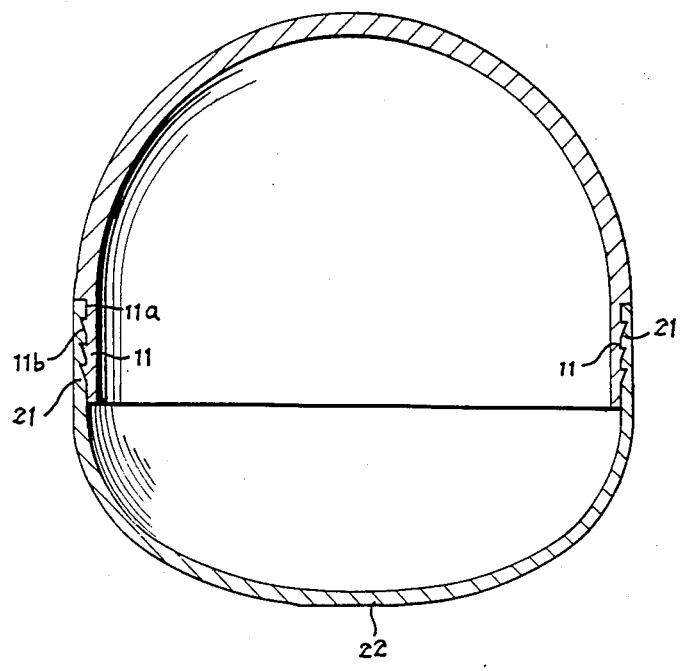
FIG. 3 is a cutaway view of a toy container in accordance with the present invention.
Figure 4:
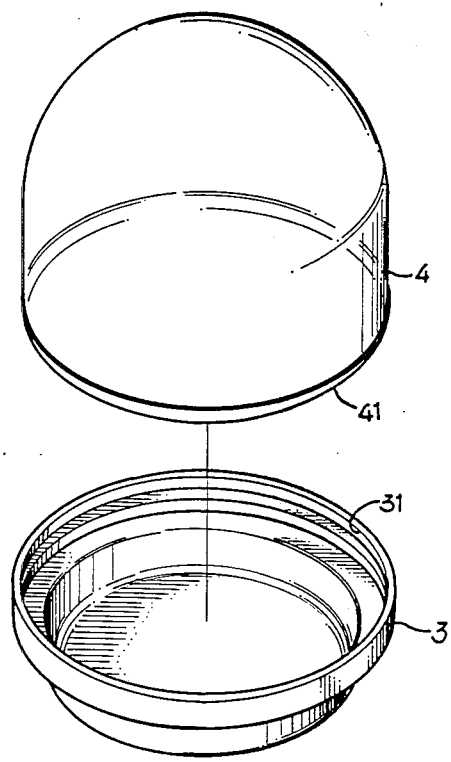
FIG. 4 is a exploded view of a prior art toy container.
Figure 5:
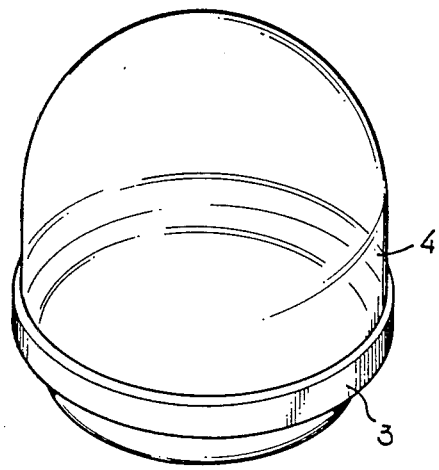
FIG. 5 is a perspective view of a prior art toy container.
Figure 6:
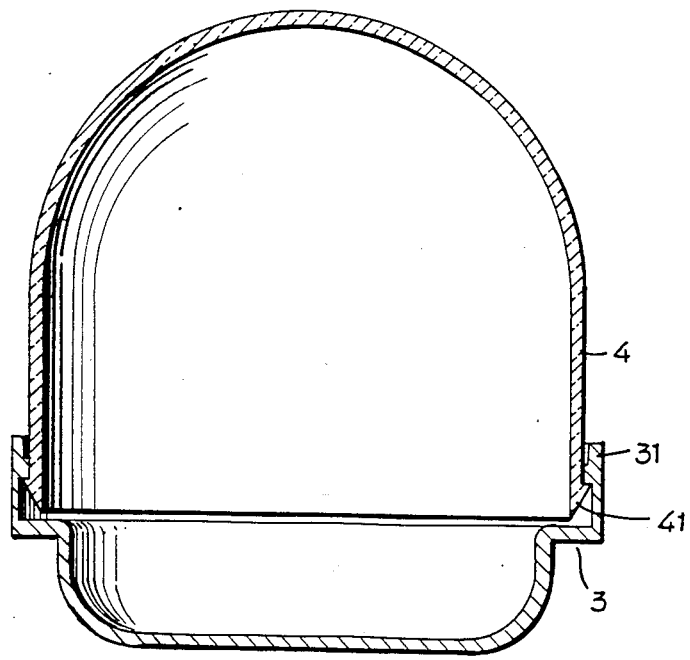
FIG. 6 is a cutaway view of a prior art toy container.

Turning to FIG. 3, it can be seen that each of the three annular ribs 11 of the upper shell 1 contain two portion 11a and 11b separately. The portion 11a is flat in shape and the portion 11b is sloping in appearance. The three annular ribs 21 of the lower shell are also the same shape as that of the upper shell, but in such a way that the ribs 11 of the upper shell and the ribs 21 of the lower shell closely attach to each other upon the upper shell and the lower shell being pressed together. These annular ribs make the upper shell and the lower shell easy to be tightened together securely while they still can be separated easily.

Through many experience, the present inventor has found out that the best number of the annular ribs is three. If the number of the annular ribs is less than three, then the toy container will be too easy to open. On the other hand, if the number of the annular ribs is greater than three, the toy container will be too difficult to open. With a toy container having three annular ribs in its upper shell and lower shell separately, it is easy to close the toy container securely by holding the upper shell and the lower shell together. Furthermore, it is also easy to open the toy container by pressing and pulling off the upper shell from the lower shell.

Referring to FIG. 3 again, it can be seen that the base 22 of the lower shell 2 is flat in shape, which is formed so that the toy container can stand upright.

As various possible embodiments might be made of the above invention without departing from the scope of the invention, it is to be understood that all matter herein described or shown in the accompanying drawings is to be interpreted as illustrative and not in a limiting sense. Thus it will be appreciated that the drawings are exemplary of a preferred embodiment of the invention and that the scope of the invention is to be limited only by the scope of the appended claims.

I claim:

1. A toy container comprising an upper shell and a lower shell, wherein the lower portion of said upper shell has three annular ribs therein, each of said annular ribs being formed by a flat portion and a sloping portion separately, the upper portion of said lower shell having also three annular ribs which cooperate with said three annular ribs of said upper shell in such a way that said annular ribs of the upper shell and said annular ribs of the lower shell will closely attach to each other upon holding the upper shell and the lower shell together.

2. The toy container of claim 1 wherein the base of said lower shell is flat.

* * * * *